United States Patent
Yoshida et al.

(10) Patent No.: US 6,683,720 B2
(45) Date of Patent: Jan. 27, 2004

(54) REFLECTOR, SIDELIGHT TYPE BACKLIGHTING APPARATUS AND REFLECTOR SUBSTRATE

(75) Inventors: Hirotaka Yoshida, Sodegaura (JP); Shin Fukuda, Sodegaura (JP); Hiroshi Ishikawa, Sodegaura (JP); Masaru Tanabe, Sodegaura (JP)

(73) Assignee: Mitsui Chemicals, Inc., Tokyo (JP)

( * ) Notice: Subject to any disclaimer, the term of this patent is extended or adjusted under 35 U.S.C. 154(b) by 0 days.

(21) Appl. No.: 10/203,751

(22) PCT Filed: Dec. 14, 2001

(86) PCT No.: PCT/JP01/10965
§ 371 (c)(1),
(2), (4) Date: Aug. 13, 2002

(87) PCT Pub. No.: WO02/48756
PCT Pub. Date: Jun. 20, 2002

(65) Prior Publication Data
US 2003/0137739 A1 Jul. 24, 2003

(30) Foreign Application Priority Data

| Dec. 14, 2000 | (JP) | 2000-380773 |
| Dec. 14, 2000 | (JP) | 2000-386774 |
| Apr. 24, 2001 | (JP) | 2001-125263 |
| Jul. 4, 2001 | (JP) | 2001-202837 |

(51) Int. Cl.$^7$ .............................................. G02B 13/20

(52) U.S. Cl. .................... 359/599; 359/883; 359/884; 359/707

(58) Field of Search ................... 359/599, 883, 359/884, 831, 707; 349/87, 96, 112; 362/516, 296, 520, 590; 428/38, 141, 142, 426, 908, 913

(56) References Cited

U.S. PATENT DOCUMENTS

| 4,880,677 A | * 11/1989 | Hecq et al. ............... 428/38 |
| 5,204,765 A | 4/1993 | Mitsui et al. |
| 5,410,454 A | 4/1995 | Murase et al. |

(List continued on next page.)

FOREIGN PATENT DOCUMENTS

| DE | 195 21 254 A1 | 1/1996 |
| EP | 0 495 679 A2 | 7/1992 |
| EP | 0 534 140 A1 | 3/1993 |
| EP | 0 879 991 A2 | 11/1998 |
| EP | 0 939 273 A1 | 9/1999 |
| JP | 11-52370 A | 2/1999 |
| JP | 11-258602 A | 9/1999 |

OTHER PUBLICATIONS

TAI, C.Y., "24.1: A Transparent Frontlighting System for Reflective–Type Displays," 95 DIGEST pp. 375 (1995) Holland, Ohio.

Primary Examiner—Mohammad Sikder
(74) Attorney, Agent, or Firm—Burns, Doane, Swecker & Mathis, LLP

(57) ABSTRACT

An object of the invention is to provide a sidelight type backlighting apparatus having high brightness, which is yet reduced in uneven brightness, and to provide a reflector substrate having a surface profile necessary for obtaining such apparatus and a reflector having high brightness and long durability in which the reflector substrate is implemented. A buffer against strain is formed by providing space by protrusions or the like between a light guiding plate of a planar light source apparatus and a reflecting surface of a reflection sheet provided on one main surface of the light guiding plate. Further, a base layer, a metallic layer mainly containing silver, and a light transmitting oxide layer are laminated on the substrate in this order to form a reflection layer.

44 Claims, 2 Drawing Sheets

U.S. PATENT DOCUMENTS

| | | |
|---|---|---|
| 5,442,523 A | 8/1995 | Kashima et al. |
| 5,608,550 A | 3/1997 | Epstein et al. |
| 5,730,518 A | 3/1998 | Kashima et al. |
| 5,894,539 A | 4/1999 | Epstein et al. |
| 6,123,442 A | 9/2000 | Freier et al. |
| 6,199,995 B1 | 3/2001 | Umemoto et al. |
| 6,334,690 B1 | 1/2002 | Ohkawa |
| 6,381,068 B1 * | 4/2002 | Harada et al. ............... 359/443 |
| 6,568,840 B1 * | 5/2003 | Mabe et al. ................. 362/516 |
| 2001/0019479 A1 | 9/2001 | Nakabayashi et al. |

\* cited by examiner

REFLECTOR, SIDELIGHT TYPE BACKLIGHTING APPARATUS AND REFLECTOR SUBSTRATE

TECHNICAL FIELD

The present invention relates to a reflector having high reflectivity and brightness, which is yet reduced in uneven brightness, to a sidelight type backlighting apparatus using the same, applied to a liquid crystal display apparatus, and to a reflector substrate.

BACKGROUND ART

Liquid crystal displays are thinner and are more compact as compared with CRT (Cathode Ray Tube) displays known heretofore, and because they operate at lower voltage, consume less power, and hence are energy saving, they are used not only as displays of small to medium size apparatuses, but also in a wider field.

The liquid crystal displays widely used at present are transmission type liquid crystal displays using backlighting for the light source. The display clarity of the liquid crystal display owes not only on the performance of the liquid crystal itself, but also on the performance of the backlighting. Due to the recent indispensable requirements on further lightweight and thinner liquid crystal displays, uniformity in brightness, and for reasons that the heat from the light source is hardly transmitted to the liquid crystal panel, the reflector is no longer placed on the front of the light source as in the direct transflective type, but backlighting of a sidelight type using a light guiding plate to provide a planar light source, which is produced by allowing the light from the light source set on one end to undergo multipath reflection, is employed as the method of backlighting.

An uneven reflection member made of white-colored PET (polyethylene terephthalate) film and the like is often provided on one main surface of the light guiding plate, and uniform brightness is there by achieved by diffusing light with the uneven reflection member. However, since such an uneven reflection member yields almost no regular reflection component, the brightness obtained as a result is uniform, but there is a problem that the luminance as a whole is still insufficient. Further, although the luminance can be improved in the case a sheet comprising aluminum vapor-deposited on a transparent or light transmitting PET film is used, the diffuse reflection component is lost, and a slight strain of the sheet causes irregular luminance and makes it impossible to obtain an image of high quality. In order to overcome these problems, a sheet comprising a metal vapor-deposited on a surface-roughened film was developed; however, in the case aluminum is used for the metal, a sheet having excellent durability could be obtained, but the brightness remained yet to be improved. In the case of using silver, which has the highest reflectance in the visible wavelength region, there was found a problem that, even though sufficiently high brightness is obtained, the brightness decreases with the passage of time due to rapid degradation ascribed to the poor durability of silver.

DISCLOSURE OF INVENTION

The invention provides a reflector having high brightness and long durability, capable of preventing uneven brightness caused by strain which may occur on the reflector; a sidelight type backlighting apparatus having the reflector incorporated therein; and a reflector substrate.

The present inventors have extensively conducted studies in order to solve the problems mentioned above, and, as a result, they have found that a sidelight type backlighting apparatus can be achieved in which uneven brightness is eliminated or considerably reduced and high brightness is obtained, by providing a reflector having adequate diffuse reflectance on one main surface of a light guiding plate so as to make space between the light guiding plate and a reflection layer of the reflector. More specifically, uneven brightness could be reduced by forming on the reflector specific protrusions which also serve as spacers for making the space between the light guiding plate and the reflection layer.

The invention provides a reflector comprising a substrate and a reflection layer formed on one main surface of the substrate, wherein diffusivity of the reflector exists within a range of 1 to 50%, the diffusivity being defined as ratio of diffuse reflectance to total reflectance.

According to the invention, since an adequate reflectance can be obtained, when the reflector is incorporated in a backlighting apparatus for liquid crystal display apparatuses, uneven brightness can be eliminated or considerably reduced while high brightness being simultaneously obtained.

Further, in the invention it is preferable that the substrate is made of a polymer film.

According to the invention, it is possible to realize a reflector which has a high degree of flexibility in configuration and high productivity.

Further, in the invention it is preferable that the reflector has a total reflectance of 90% or higher and a diffuse reflectance of 15% or lower at a wavelength of 550 nm.

According to the invention, it is possible to achieve a reflectance which is adequate for human sensitivity to light.

Furthermore, in the invention it is preferable that the reflector comprises protrusions on the reflection layer side of the substrate, number of the protrusions per square millimeter area of the substrate being two or more but not more than 100, the protrusions each having a maximum width of 0.1–50 $\mu$m and a height of 0.1–45 $\mu$m.

According to the invention, it is possible to achieve an optimal reflectance.

In the invention it is preferable that the protrusions have a maximum width of 10–50 $\mu$m and a height of 5–45 $\mu$m.

According to the invention, it is possible to achieve an optimal reflectance.

Furthermore, it is preferable that the protrusions are formed by applying to the substrate a coating solution which contains particles having a mean particle size of 0.1 $\mu$m or greater but not greater than 50 $\mu$m, and a binder resin.

According to the invention, it is possible to achieve high productivity and cost reduction.

Furthermore, in the invention it is preferable that the protrusions are formed by applying to the reflection layer a coating solution which contains particles having a mean particle size of 0.1 $\mu$m or greater but not greater than 50 $\mu$m, and a binder resin.

According to the invention, it is possible to form suitable protrusions in accordance with the conditions of the coating solution and substrate.

Furthermore, in the invention it is preferable that the polymer film has protrusions which are formed by fine particles contained therein.

According to the invention, it is possible to achieve high productivity and cost reduction.

Furthermore, in the invention it is preferable that the reflection layer comprises a base layer (a), a metallic layer mainly containing silver (b), and a protective layer (c), the layers being laminated in the order of (a), (b), (c) on the substrate.

According to the invention, it is possible to form a reflector which has high reflectivity and excellent durability.

Furthermore, in the invention it is preferable that the base layer (a) comprises a metallic layer made of one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm; and/or a light transmitting oxide layer made of a light transmitting oxide, having a thickness of 1 nm or more but not more than 20 nm.

According to the invention, it is possible to achieve a desired barrier effect, to prevent agglomeration from occurring on the metallic layer mainly containing silver, and to obtain excellent adhesiveness between the substrate and the reflection layer.

Furthermore, in the invention it is preferable that the metallic layer mainly containing silver (b) has a thickness of 70 nm or more but not more than 400 nm, and comprises simply silver, or comprises at least one selected from the group consisting of gold, copper, nickel, iron, cobalt, tungsten, molybdenum, tantalum, chromium, indium, manganese, titanium, and palladium, or an alloy mainly containing silver.

According to the invention, it is possible to achieve a desired reflectance by adopting a sufficiently thick metallic layer.

Furthermore, in the invention it is preferable that the protective layer (c) comprises a metallic layer made of one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm, and/or a light transmitting oxide layer made of a light transmitting oxide, having a thickness of 1 nm or more but not more than 20 nm.

According to the invention, it is possible to achieve a desired barrier effect and to prevent agglomeration from occurring on the metallic layer mainly containing silver.

Furthermore, in the invention it is preferable that the other main surface of the substrate having no reflection layer formed thereon is subjected to a smoothing treatment.

According to the invention, the operability for incorporating the reflector into a liquid crystal display apparatus or the like can be improved.

The invention provides a sidelight type backlighting apparatus comprising a light source; a light guiding plate for transmitting and letting out light incident from the light source, the light source being disposed on a side surface side of the light guiding plate; and the reflector disposed on one main surface of the light guiding plate.

According to the invention, adequate reflectance is achieved in the sidelight type backlighting apparatus, and therefore, when he apparatus is into an apparatus such as a liquid crystal display apparatus, uneven brightness can be eliminated or considerably reduced while simultaneously high brightness being obtained.

In the invention it is preferable that the reflector is arranged such that the reflection layer is opposed to the light guiding plate.

According to the invention, the interval between the light guiding plate and the reflection layer can be easily controlled by protrusions.

The invention provides a reflector substrate, comprising a base; and protrusions formed on one main surface of the base, number of the protrusions per square millimeter area of the base being two or more but not more than 100, the protrusions each having a maximum width of 10–50 $\mu$m and a height of 5–45 $\mu$m.

According to the invention, it is possible to obtain an optimal reflectance.

In the invention it is preferable that the other main surface of the base is subjected to smoothing treatment.

According to the invention, the operability of incorporating the reflector into an apparatus such as a liquid crystal display apparatus can be improved.

Further, the invention provides a liquid crystal display apparatus comprising said sidelight type backlighting apparatus.

According to the invention, it is possible to realize a liquid crystal display apparatus in which uneven brightness can be eliminated or considerably reduced while simultaneously high brightness can be obtained.

In the sidelight type backlighting apparatus in which a reflector using the reflector substrate according to the invention is incorporated, no uneven brightness generates even in a case where a strain generates on the reflector. Accordingly, by adopting the sidelight type backlighting apparatus, a liquid crystal display with clear vision can be provided. Furthermore, the reflector not only has high brightness as compared with a conventional reflector, but also has long durability; the backlighting apparatus offers uniform light of high brightness over a long period of time, and thereby enables a liquid crystal improved in display function.

BRIEF DESCRIPTION OF DRAWINGS

Other and further objects, features, and advantages of the invention will be more explicit from the following detailed description taken with reference to the drawings wherein.

BEST MODE FOR CARRYING OUT THE INVENTION

Figure 1:
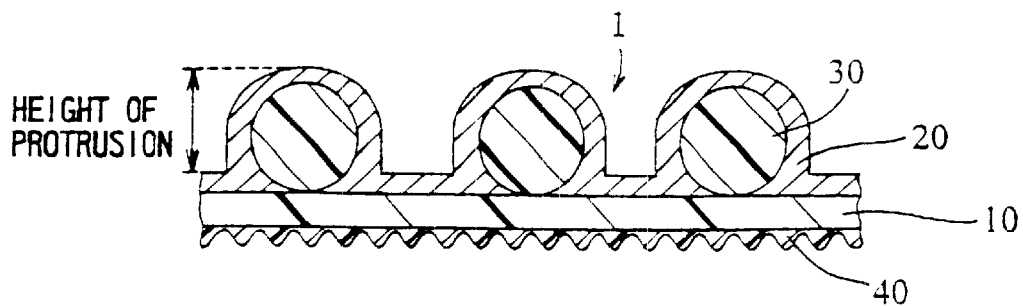
FIG. 1 is a sectional view showing a reflector 1 according to an embodiment of the invention.

Now referring to the drawings, preferred embodiments of the invention are described below.

In this specification, one main surface of the substrate where a reflection layer described below is formed is referred to as "surface A", and the other main surface of the substrate is refereed to as "surface B".

FIG. 1 is a sectional view of a reflector 1 according to an embodiment of the invention. The reflector of the invention is composed of a substrate 10 and a reflection layer 20. On the surface A side are formed protrusions by application of particles 30, and on the surface B side is formed a smoothed layer 40.

Figure 2:
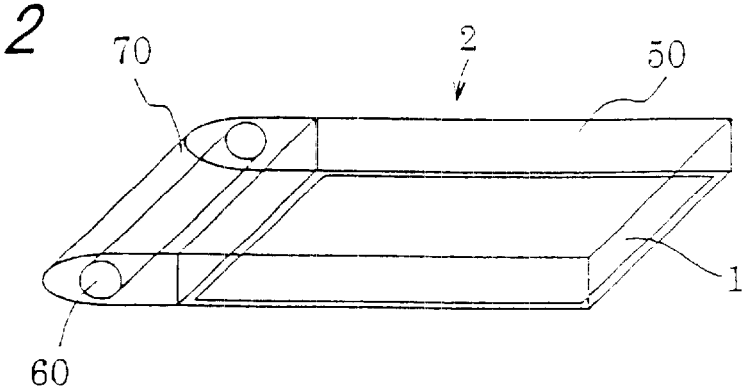
FIG. 2 is a sidelight type backlighting apparatus 2 according to an embodiment of the invention.

FIG. 2 is a perspective view of a sidelight type backlighting apparatus 2 having the reflector 1. In the sidelight type backlighting apparatus 2, the reflector 1 is arranged such that the reflection layer 20 is brought into contact with one main surface of a light guiding plate 50. The sidelight type backlighting apparatus 2 has a light source 60 and a lamp reflector 70 disposed on the side surface side thereof. The light emitted from the light source 60 is reflected by the reflector 1. The sidelight type backlighting apparatus 2 is attached to the rear surface of the liquid crystal display panel, so as to function as a planar light source apparatus.

In the invention, on measuring the reflectance of the reflector 1 from at least one of the surface A and surface B sides, the ratio of the diffuse reflectance to the total reflectance (diffuse reflectance/total reflectance; diffusivity) for a light 550 nm in wavelength is 1–50%, preferably 1–20%, particularly preferably 1–17%, and further preferably 1–15%; the total reflectance is generally 85% or higher, preferably 90% or higher, and particularly preferably 90–99%, while the diffuse reflectance is 50% or lower, preferably 20% or lower, more preferably 17% or lower, and particularly preferably 1–15%. Note that, in a wavelength of 550 nm, light sensitivity by human eyes is the most intensive. Therefore, light 550 nm in wavelength is suitably employed for evaluation of actual viewability.

The substrate 10 is made of a plate- or sheet-shaped inorganic material such as a physically and chemically stable glass plate or ceramic plate, or an organic material such as a polymer sheet or polymer film. Among them, a polymer film is particularly preferable from the viewpoint of a high degree of flexibility in configuration. For example, by using it, a roll-to-roll process can be adopted to form the reflection layer 20.

In the reflector 1 according to the present invention, mentioned as preferable polymer films are the films of various types of plastics, for instance, polyesters such as polyethylene terephthalate (PET) or polyethylene naphthalate; polycarbonates such as bisphenol A based polycarbonate; polyolefins such as polyethylene, polypropylene, cyclic olefin copolymers, or ethylene-vinyl acetate copolymers; cellulose derivatives such as cellulose triacetate; vinyl resins such as polyvinylidene chloride or polyvinyl butyral; polystyrenes; polyimides; polyamides such as nylon; polyethersulfone; polysulfone resins; polyarylate resins; fluororesins; polyether ether ketones; polyurethanes; polyacrylic acid; polyacrylic esters; polymethacrylic acid; polymethacrylate esters; nitrites such as polyacrylonitrile or polymethacrylonitrile; polyethers such as polyethylene oxide; epoxy resin; polyvinyl alcohols; and polyacetals such as poval, but are not only limited thereto, and there can also be used those having crystallization temperature, glass transition temperature higher than room temperature, and having a smooth surface. Particularly preferred among them are polyesters such as polyethylene terephthalate, polycarbonates, and polyamides.

The usable polymer film should have a thickness ranging from 1 to 250 $\mu$m, preferably, 5 to 200 $\mu$m, and more preferably, 10 to 200 $\mu$m, and also have tensile elasticity, bending elasticity of 100 MPa or above, preferably, 500 MPa or above, more preferably, 800 MPa or above, and particularly preferably, 1000 MPa or above.

The reflector 1 according to the invention preferably comprises protrusions on the below-described reflection layer 20 side of the substrate 10. The protrusions above may be directly formed on the substrate 10, or may be provided by adhering a separately prepared film or sheet of protrusion layer to the substrate 10. Otherwise, they can be formed on the reflection layer 20 described hereinafter.

The maximum width of the protrusions above is in a range of 0.1–50 $\mu$m, preferably 1–50 $\mu$m, more preferably 10–50 $\mu$m, further preferably 15–45 $\mu$m, and particularly preferably, 20–40 $\mu$m. The height of the protrusions is in a range of 0.1–45 $\mu$m, preferably 1–45 $\mu$m, more preferably 5–45 $\mu$m, further preferably 10–40 $\mu$m, and particularly preferably, 15–35 $\mu$m. The shape of the protrusions is not particularly limited, and the protrusions can be formed in the shape of, for instance, particles, domes, hills, pyramids, cylinders, triangular prisms, trapezoids, prisms, or undefined shapes. Furthermore, they can be provided in a single step or in multiple steps, and the shapes maybe mixed or combined in multiple steps. It is preferable to provide 2 to 100 protrusions, more preferably, 5 to 90 protrusions per square millimeter area of the substrate 10.

There is no particular restriction concerning the method for forming the protrusions above, but the following methods can be applicable:

(1) a method comprising applying solid matter such as particles;

(2) a method comprising kneading solid matter such as particles with a resin, and forming the resulting product into a film or a sheet;

(3) a method comprising scattering solid matter such as particles on a film or a sheet in a semi-molten state, and then cooling the product for fixing;

(4) a method comprising forming protrusions by utilizing printing techniques such as screen printing;

(5) a method comprising using a cooling roll having uneven shapes in shaping a thermoplastic resin into a sheet or a film, thereby transferring the uneven shape of the roll as the protrusions;

(6) a method comprising forming by using micro molds;

(7) a method comprising a polishing or rubbing process step using sandblasting and the like;

(8) a method comprising forming by using photolithography; and (9) a method comprising forming by using an etching process.

Furthermore, the protrusions obtained by the aforementioned methods and the like may be deformed by, for example, a thermal treatment.

Particularly among methods for forming the protrusions above, preferred is to employ the method comprising applying particles 30, which is relatively easy in controlling the surface state. As the particles to be applied, mentioned as non-limiting are the polymer (organic) particles such as those of acrylate, polystyrene, polyvinyl benzene, polystyrene methacrylate, polystyrene acrylate, or polystyrene butadiene; inorganic fine particles such as those of silica, alumina, titania, zirconia, lead oxide (lead white), zinc oxide (zinc white), calcium carbonate, barium carbonate, barium sulfate, potassium titanate, or sodium silicate; and electrically conductive light transmitting fine particles such as those of tin oxide, indium oxide, cadmium oxide, or antimony oxide. Particularly preferred among them are used acrylic resin or silica.

The particles 30 to be applied in the invention have a mean particle diameter in a range of 0.1–50 $\mu$m, preferably 1–50 $\mu$m, more preferably 10–50 $\mu$m, further preferably 15–45 $\mu$m, and particularly preferably, 20–40 $\mu$m.

The particle size distribution of the particles 30 above preferably falls in a narrow range, and preferably, the standard deviation of the particle diameter with respect to the mean particle diameter accounts for 50% or less, further preferably 40% or less. It should be noted that, if necessary, two or more types of particles maybe used. In this case, the principal particles should preferably account for 50% or above of the total, more preferably, 70% or above, further preferably, 75% or above, particularly preferably, 80% or above.

The distribution of the mean particle diameter can be measured by applying dynamic light scattering method to a solution having dispersed there in a small amount of the particles. Otherwise, it can be obtained from the particle diameter read on randomly selected 100 particles in SEM (Scanning Electron Microscope) micrographs of the particles. The particle diameter may be read by using an optical microscope other than SEM micrograph. Furthermore, the particle size distribution can be obtained by image processing the micrographs or the images.

In general, the particles 30 above are applied in a state dispersed in a resin used as the binder. As the binder resin, usable are, for example, acrylic resins such as polymethylmethacrylate, polyacrylonitrile resins, polymethacrylonitrile resins, silicone resins such as the polymers obtained from ethyl silicate, fluororesins, polyester resins, polystyrene resins, acetate resins, polyether sulfone resins, polycarbonate resins, polyamide resins, polyimide resins, polyolefin resins, polyurethane resins, urea resins, melamine resins, epoxy resins, and mixtures thereof, but are not particularly restricted thereto. The resins are selected by taking the adhesiveness with the substrate 10 and the particles 30 into consideration. Preferred among them are polyester resins and acrylic resins.

In general, the particles 30 are dispersed in the binder resin by using a solvent. As the solvent, favorably used are, for instance, toluene, methyl ethyl ketone, ethyl acetate, or isopropanol. These solvents are commonly used in the applying operation, and solvents other than those enumerated above may be used without any problem so long as they do not affect the substrate 10 and the particles 30. Furthermore, if necessary, there may be incorporated additives such as a bridging agent, e.g., an isocyanate or a melamine, a wetting agent, a thickener, a dispersant, or a defoaming agent.

The ratio of blending the particles 30 to the binder resin is preferred in the case the ratio of the particles 30 is in a range 0.1 wt % or higher but not higher than 10 wt %. A blend ratio of lower than 0.1 wt % is not preferred because the desired diffusion characteristics of the reflection light cannot be obtained. On the other hand, in the case the ratio is higher than 10 wt %, the light diffusion becomes too strong and thus is not preferred.

The coating solution containing the particles 30 is preferably applied to the substrate 10 at a wet coverage of 10 g/m$^2$ or more, preferably, 40 g/m$^2$. The particle density on the reflector 1 surface reflects the blend ratio of the particles, and influences the diffusion coefficient of the reflector 1. The coverage is reflected to the thickness of the binder layer formed on the substrate 10, and influences the height difference to the apex of the particle 30 and the reflection layer 20, i.e., to the interval between the light guiding plate 50 and the reflector 1 brought into contact each other. In the case the coverage of the coating solution is decreased to less than 10 g/m$^2$, the amount of the particles 30 contained in the coating solution falls short to result in unfavorable cases unable to obtain the desired diffusion characteristics of the reflection light. In the case the coverage is increased to more than 40 g/m$^2$, there may occur cases unable to achieve the desired protrusion height due to the burial of the particles 30 in the binder resin. That is, 2 to 100 protrusions per square millimeter area of the substrate 10 can be obtained on the substrate 10 by controlling the amount of blending the particles and the coverage of the coating solution in the ranges above. The height of the protrusion can be easily measured by using a contact stylus roughness meter or a surface profiler.

As a method of applying the mixed solution containing the particles 30 above and the binder resin onto the substrate 10, there can be mentioned methods capable of applying solutions widely ranging in viscosity, which is yet capable of controlling the coating thickness during operation and of greatly changing the coating thickness, such as a roll coater method and a reverse roll coater method; or a gravure coating method which is capable of providing a thin film coating and a wide coating with uniform thickness, and yet applicable without requiring relatively high operation skill; or a die coating (extrusion) method capable of achieving high speed coating, high productivity, uniform coating thickness and a wide area coating. Any of the above-mentioned methods can be employed to achieve the density and height of the protrusion.

As other preferred methods for forming protrusions, there may be used a method comprising adding particles in the polymer film serving as the substrate 10.

As the particles usable in the method of adding particles, the materials similar to those described as particles to be used in the coating methods.

The particles are kneaded with the resin in molten state, and the product may be formed into a film or a sheet, or the particles may be scattered on a film or a sheet in semi-molten state, and if necessary, the particles may be fixed by applying pressing or cooling treatment thereto to form the protrusion layer.

As a method for forming protrusions by printing, preferably employed is screen printing using an ultraviolet (UV) curable resin. More specifically, a UV curable resin is screen printed through the net openings (screen apertures), and the resin is cured by exposure. The method is characterized by that it enables forming relatively high protrusions (10–30 $\mu$m in height) in various shapes.

Among the films or sheets above, those having a protrusion layer containing two or more but not more than 100 protrusions each having a maximum width of 10–50 $\mu$m and a height of 5–45 $\mu$m are favorably used as a reflector substrate.

The reflector 1 according to the invention can be obtained, for example, by forming a reflection layer 20 on the protrusions thus formed by various methods described above. Otherwise, the protrusions can be formed after forming a reflection layer 20 on the substrate 10, and additional protrusions may be further formed on the reflection layer.

The reflection layer 20 is preferably formed by stacking a base layer (a), a metallic layer mainly containing silver (b), and a protective layer (c) on the substrate 10 in this order.

For the base layer (a), preferably used is a metal layer different from silver or a metal oxide layer. The examples thereof includes: an elemental metal selected from the group consisting of gold, copper, nickel, iron, cobalt, tungsten, molybdenum, tantalum, chromium, indium, manganese, titanium, palladium, zirconium, bismuth, tin, zinc, antimony, cerium, neodymium, lanthanum, thorium, magnesium, and gallium; an alloy containing two or more elemental metals selected from the group; an oxide of a metal selected from the group consisting of indium, titanium, zirconium, bismuth, tin, zinc, antimony, tantalum, cerium, neodymium, lanthanum, thorium, magnesium, and gallium; a mixture of these oxides; and a metal compound such as sulfides of zinc. Preferred among them are an elemental metal selected from the group consisting of gold, copper, nickel, iron, cobalt, tungsten, molybdenum, tantalum, chromium, indium, manganese, titanium, palladium; an alloy containing two or more metals selected from the group; zinc oxide; indium oxide; tin oxide; and silicon oxide. Particularly preferable is a transparent or light transmitting oxide such as zinc oxide doped with 5% by weight or less of aluminum oxide, zinc oxide doped with 10% by weight or less of gallium, an oxide of indium and tin (ITO), or silicon dioxide. Furthermore, two or more selected therefrom may be combined or provided in multiple layers.

For the metallic layer mainly containing silver (b), preferably used is an elemental silver, or such containing a small amount of gold, copper, nickel, iron, cobalt, tungsten, molybdenum, tantalum, chromium, indium, manganese, titanium, and palladium as an impurity, The contents of such impurities, though varies with the type of metal, should preferably be kept in a range from 0.002 to 8 wt %, more preferably, 0.004 to 5 wt %, particularly preferably, 0.005 to 4 wt %.

For the protective layer (c), in addition to the metals and oxides similar to those used in the base layer (a), usable are two or more selected from them and alloys based on silver, either by combining them or by providing a multilayer thereof.

Preferably used among them is a metal oxide, more preferably, an oxide of a metal such as indium, titanium, zirconium, bismuth, tin, zinc, antimony, tantalum, cerium, neodymium, lanthanum, thorium, magnesium, or gallium, or a mixture of these oxides, particularly preferably, a light transmitting oxide such as zinc oxide doped with 5% by weight or less of aluminum oxide, zinc oxide doped with 10% by weight or less of gallium, an oxide of indium and tin (ITO), or silicon dioxide.

The metallic thin film, i.e. the base layer; the metal layer mainly containing silver; and the protective layer, may be formed by a wet method or a dry method. A wet method collectively refers to plating method, and it comprises depositing metal from a solution to form a film. More specifically, there can be mentioned silver mirror reaction. On the other hand, a dry method collectively refers to vacuum film deposition method, and specific examples thereof include resistance heating type vacuum evaporation method, electron beam heating type vacuum evaporation method, ion plating method, ion-beam assisted vacuum evaporation method, or sputtering method. Particularly preferred in the invention is a vacuum film deposition method capable of realizing roll-to-roll method for continuous deposition of the film.

In vacuum evaporation method, to increase the vapor pressure, the raw metallic material is molten by using, for instance, electron beam, resistance heating, or induction heating, and the metal is evaporated preferably at a pressure of 13.3 mPa (0.1 mTorr) or lower on to the surface of the substrate. In this case, a gas such as argon may be introduced at a pressure of 13.3 mPa or higher so as to induce radio frequency or direct current glow discharge.

As the sputtering method, usable are, for example, DC magnetron sputtering method, RF magnetron sputtering method, ion beam sputtering method, ECR sputtering method, conventional RF sputtering method, or conventional DC sputtering method. In the sputtering method, a metallic plate target is favorably used as the raw material, and for the sputtering gas, usable are, for instance, helium, neon, argon, krypton, xenon, but preferably used is argon. The purity of the gas is preferably 99% or higher, and more preferably, 99.5% or higher. Preferably used is vacuum film deposition method for forming a light transmitting oxide film. Mainly used is the sputtering method using as the sputtering gas, for example, helium, neon, argon, krypton, or xenon; but depending upon conditions, gaseous oxygen is used.

The thickness of the thin film that is formed on the protrusions or the substrate is determined by taking into consideration that a reflector 1 having a light transmittance lower than 1% can be obtained.

The thickness of the layers constituting the reflection layer according to the invention is preferably set as follows.

In the case metallic layer is used for the base layer (a), the thickness thereof is preferably 5 nm or more but not more than 50 nm, more preferably, 5 nm or more but not more than 30 nm. In the case the thickness of the layer is thinner than 5 nm, the desired barrier effect cannot be achieved, and agglomeration may occur on the metallic layer mainly containing silver (b). Even in the case the layer is provided thicker than 50 nm, it does not provide an additional effect. In the case a light transmitting oxide is used, the thickness of the light transmitting oxide layer is preferably 1 nm or more but not more than 20 nm, more preferably, 5 nm or more but not more than 10 nm. In the case the thickness of the light transmitting oxide layer is thinner than 1 nm, the desired barrier effect cannot be achieved, and agglomeration may occur on the metallic layer mainly containing silver (b). Even in a case the layer is provided thicker than 20 nm, it does not provide an additional effect.

The thickness of the metallic layer mainly containing silver (b) is preferably 70 nm or more but not more than 400 nm, more preferably, 100 nm or more but not more than 300 nm, and most preferably, 150 nm or more but not more than 250 nm. In the case the layer mainly containing silver is provided at a thickness thinner than 70 nm, an insufficient metallic layer is formed so that there may be cases in which the desired reflectance would not be obtained. A layer thicker than 400 nm does not show any additional effect.

The thickness of the protective layer (c) is, in the case a metallic layer is used, preferably 5 nm or more but not more than 50 nm, and more preferably, 5 nm or more but not more than 30 nm. A layer thinner than 5 nm makes it impossible to achieve the desired barrier effect, and it may cause agglomeration on the metallic layer mainly containing silver (b). Even in a case the layer is provided thicker than 50 nm, it does not provide an additional effect. In the case a light transmitting oxide is used, the thickness of the layer is preferably 1 nm or more but not more than 20 nm, more preferably, 5 nm or more but not more than 10 nm. In the case the thickness of the light transmitting oxide layer is thinner than 1 nm, the desired barrier effect cannot be achieved, and agglomeration may occur on the metallic layer mainly containing silver (b) Even in a case the layer is provided thicker than 20 nm, it does not provide an additional effect.

As means for measuring the film thickness of each of the layers above, there can be mentioned, for example, a contact probe roughness meter, a repetition reflection interferometer, microbalance, or quartz oscillator method, and particularly suitable for obtaining the desired film thickness is the use of the quartz oscillator method because it allows measuring of the film thickness during film deposition. In addition, there also is a method comprising previously setting the conditions of film deposition, forming the film by deposition on the sample substrate, and after investigating the relation between the film deposition time and the film thickness, controlling the film thickness in accordance with the deposition time.

The sidelight type backlighting apparatus 2 according to the invention is characterized in that the reflector 1 prepared above is placed on one main surface of the light guiding plate 50 so that the metallic thin film of the substrate 10 is opposed to the light guiding plate. As the backlighting apparatus, those generally used as a sidelight type maybe used.

As the light guiding plates 50 are used those having transparency for light in a wavelength region of ca. 400 nm–700 nm, for instance, light transmitting resins including an acrylic resin such as polymethyl methacrylate; a polycarbonate resin such as polycarbonate or polycarbonate-polystyrene composition; an epoxy resin; or glass; however, the material is not only limited thereto, and any material exhibiting transparency with respect to the wavelength region of the light source may be used without any restriction. The thickness of the light guiding plate 50 may be properly selected depending on the size of the light guiding plate used for the achievement of the object, or on the size of the light source.

As the usable light source 60, there can be mentioned, for instance, an incandescent lamp, a light emitting diode (LED), an electro luminescence (EL) device, a fluorescent lamp, or a metal hydride lamp, and favorably used among them is a fluorescent lamp. Fluorescent lamps are roughly classified into a hot cathode type and cold cathode type depending on the structure of the electrodes and the lighting method, and electrodes as well as inverters tend to become bigger for the hot cathode type. The hot cathode type suffers little electrolytic corrosion in the vicinity of the electrode not contributing to the light emission and is thereby efficient, has a light emission efficiency several times as large as that of the cold cathode type, and exhibits intense light emission; however, the cold cathode type is superior concerning its life, and the cold cathode type is preferably used from the viewpoint of low power consumption and durability.

The sidelight type backlighting apparatus 2 according to the invention surprisingly suppresses uneven brightness by providing the reflector 1 between the light guiding plate 50 and the reflection layer 20 at a predetermined interval. Specifically, this interval is a gap between the recess of the reflection layer 20 and the light guiding plate 50, as viewed from the light guiding plate 50. Usually, the light guiding plate 50 makes direct contact with the reflector 1. Therefore, in the case where the reflector 1 is arranged so that the surface A of the reflector 1 is opposed to the light guiding plate 50, the interval can be controlled by the height of the protrusion, and in the case where the reflector 1 is arranged so that the surface B of the reflector 1 is opposed to the light guiding plate 50, it can be controlled by the thickness of the substrate 10 and the height of the protrusion. Moreover, it is also possible to adjust the interval between the reflection layer 20 and the light guiding plate 50 by inserting a spacer or the like therebetween. The interval is provided at a size of 5 $\mu$m or greater, preferably 10 $\mu$m or greater, more preferably 10–100 $\mu$m, particularly preferably 10–90 $\mu$m, and further preferably 15–85 $\mu$m.

The surface B of the substrate 10 of the reflector according to the invention may be subjected to a smoothing treatment. By applying the smoothing treatment, the operability in assembling the liquid crystal display apparatus can be improved.

Although there is no particular restriction concerning the smoothing treatment, specifically mentioned are using a method of applying a coating solution containing fine particles, a method of forming irregularities by embossing, a sand blasting method comprising spraying particles of silica and the like together with a high pressure air against the surface of the substrate 10, a chemical method such as etching. Among them, favorably used is the method of applying a coating solution.

In the sidelight type backlighting apparatus according to the invention, the use of a reflector 1 produced by the methods above prevents the generation of uneven brightness even in a case where strain is generated in the reflection surface, and realizes a considerably improved brightness as compared with the devices known in the art.

EXAMPLES

The present invention is described in further detail by way of examples below.

At first, a description is given as to the case where the reflector 1 is arranged so that the surface A of the substrate 10 of the reflector 1 is opposed to the light guiding plate 50 and the interval between the light guiding plate 50 and the reflection layer 20 is controlled by the height of the protrusion.

Example 1

As the protrusions, acrylic particles 30 $\mu$m in mean particle diameter were blended at an amount of 6.0 wt % in an acrylic resin binder, and a solution was prepared by adding a solvent comprising toluene and methyl ethyl ketone in such a manner that the solution may contain 24 wt % of solid matter. The resulting solution was applied to a 188-$\mu$m thick PET film to obtain protrusions on the surface A. Then, acrylic particles 1.5 $\mu$m in mean particle diameter were blended at an amount of 2.0 wt % in an acrylic resin binder, and a solution was prepared by adding a solvent comprising toluene and methyl ethyl ketone in such a manner that the solution may contain 15 wt % of solid matter. The resulting solution was applied to a PET film to obtain a smoothed surface on the surface B.

Subsequently, a zinc oxide layer was formed at a film thickness of 5 nm on the surface A side by means of DC magnetron sputtering using zinc oxide (purity: 99.9%) doped with 2% of $Al_2O_3$ as the target and a 99.5% pure argon as the sputtering gas, whereby a base layer was formed. Then, without taking out the film from the sputtering apparatus, a 200-nm thick silver layer was formed similarly by means of DC magnetron sputtering using 99.9% pure silver as the target and a 99.5% pure argon as the sputtering gas. Subsequently, without taking out the resulting film from the sputtering apparatus, a 5-nm thick zinc oxide layer was formed by means of DC magnetron sputtering using zinc oxide (purity: 99.9%) doped with 2% of $Al_2O_3$ as the target and a 99.5% pure argon as the sputtering gas, where by a protective layer was formed. Thus, as shown in FIG. 1, a desired reflector 1 was obtained as a result. Then, by setting a 150-diameter integration sphere inside a HITACHI spectrophotometer (Model U-3400), the total reflectance and the diffuse reflectance of the reflector 1 were measured at a wavelength of 550 nm from the metallic layer side. As a result, a total reflectance of 95.6% and a diffuse reflectance of 5.6% were obtained with a diffusivity of 5.9%. Then, the height of the protrusions on the surface A was measured on ten points by means of a stylus surface profiler (DEKTAK3: manufactured by Veeco Instruments Inc.) to obtain an average value of 26.2 μm, and the maximum width thereof was measured on ten points by means of an optical microscope to obtain an average value of 30.5 μm. Further, 20 pieces of particles each 20 to 40 μm in maximum width and 15 to 35 μm in height were found present in an area of 1 mm². The reflector 1 subjected to the measurement was then placed in a thermostat under constant humidity, and was allowed to stand for 500 hours under a hot humid condition of 60° C. and 90% RH. After passage of 500 hours, the reflector 1 was taken out to observe the surface, but no agglomeration of metal was observed. On measuring again the total reflectance and the diffuse reflectance by means of spectrophotometer, a reflectance of 95.5% and a diffuse reflectance of 5.7% were obtained unchanged from the values obtained prior to the hot humid treatment. The reflector 1 was placed on one main surface of the light guiding plate 50 so that the metallic layer is opposed to the light guiding plate 50 to thereby obtain a sidelight type backlighting apparatus 2 as shown in FIG. 2. The light source 60 was turned on in this state, and measurements were made on the brightness at the center of the light-outgoing surface of the apparatus obtained along the front direction, as well as on the uneven brightness of the planar light source in the case strain was intentionally applied to the thus set reflector 1. The results are shown in Table 1.

Example 1, and the reflectance was measured again to obtain a total reflectance of 93.6% and a diffuse reflectance of 6.5%, which were found to be almost unchanged from the values obtained prior to the hot humid treatment, and without generating any agglomeration spots on the surface ascribed to the degradation of silver. The reflector 1 was then placed on one main surface of the light guiding plate 50 so that the metallic layer is opposed to the light guiding plate to thereby perform observation similar to that described in Example 1. The results are given in Table 1.

Comparative Example 1

As the protrusions, acrylic particles 5 μm in mean particle diameter were blended together with an acrylic resin binder at an amount of 2.0 wt % each, and a solution was prepared by adding a solvent comprising toluene and methyl ethyl ketone in such a manner that the solution may contain 24 wt % of solid matter. Then, a 188-μm thick PET film one surface of which was subjected to sand blasting treatment was prepared, and the resulting solution was applied to the non-treated surface of the film to obtain protrusions on the non-treated surface (surface A). Then, a reflection layer 20 was formed in conformity with the condition of Example 1, whereby a reflector 1 was obtained. Subsequently, measurements were conducted in a manner similar to that described

TABLE 1

| | reflector | | | | | | Backlight | |
|---|---|---|---|---|---|---|---|---|
| | Total reflectance (%) | | Diffuse reflectance (%) | | | | | |
| | Hot humid test | | Hot humid test | | | | Generation | |
| | Not applied | Applied | Not applied | Applied | Protrusion height (μm) | Particles/ mm² | Luminance (cd/m²) | of uneven brightness | Total evaluation |
| Ex 1 | 95.6 | 95.5 | 5.6 | 5.7 | 26.2 | 20 | 2299 | None | Good |
| Ex 2 | 93.8 | 93.6 | 6.6 | 6.5 | 28.8 | 36 | 2198 | None | Good |
| Comp Ex 1 | 94.6 | 94.2 | 66.9 | 66.4 | 2.6 | 153 | 2280 | Generated | Poor |
| Comp Ex 2 | — | — | — | — | — | — | 1500 | None | Poor |

Example 2

As the protrusions, acrylic particles 35 μm in mean particle diameter were blended together with an acrylic resin binder at an amount of 5.5 wt % each, and a solution was prepared by adding a solvent comprising toluene and methyl ethyl ketone in such a manner that the solution may contain 24 wt % of solid matter. Then, a 188-μm thick PET film one surface of which was subjected to sand blasting treatment was prepared, and the resulting solution was applied to the non-treated surface of the film to obtain protrusions on this non-treated surface (surface A). Then, a reflection layer 20 was formed in conformity with the condition of Example 1, whereby a reflector 1 was obtained. Subsequently, measurements were conducted in a manner similar to that described in Example 1 to obtain the following results: a total reflectance of 93.8%; a diffuse reflectance of 6.6%; a diffusivity of 7.0%; an average value for the height of the surface A side protrusions of 28.8 μm; an average value for the maximum width of the protrusions of 34.4 μm; and 36 particles each 25 to 45 μm in maximum width and 20 to 40 μm in height being found present in an area of 1 mm². The reflection sheet was allowed to stand for 500 hours in a thermostat of constant humidity under the same conditions as those described in in Example 1 to obtain the following results: a total reflectance of 94.6%; a diffuse reflectance of 66.9%; a diffusivity of 70.7%; an average value for the height of the surface A side protrusions of 2.6 μm; an average value for the maximum width of the protrusions of 4.0 μm; and 153 particles each 1 to 15 μm in maximum width and 1 to 10 μm in height. The reflector 1 was then placed on one main surface of the light guiding plate 50 so that the metallic layer is opposed to the light guiding plate to thereby perform observation similar to that described in Example 1. The results are given in Table 1.

Comparative Example 2

White colored PET was used as the reflector to be set under the light guiding plate. Then, observations similar to those described in Example 1 were performed. The results are given in Table 1.

As is understood from Table 1, both of Examples 1 and 2 are free from uneven brightness, achieve sufficient brightness, and exhibit satisfactory characteristics as a backlight. By contrast, Comparative Example 1 has a higher diffuse reflectance and thus suffers from uneven brightness, and Comparative Example 2 fails to offer sufficiently high brightness.

Next, a description is given as to the case where the reflector 1 is arranged so that the surface B of the substrate 10 of the reflector 1 is opposed to the light guiding plate 50 and the interval between the light guiding plate 50 and the reflection layer 20 is controlled by the thickness of the substrate 10 and the height of the protrusion.

Example 3

Figure 3:
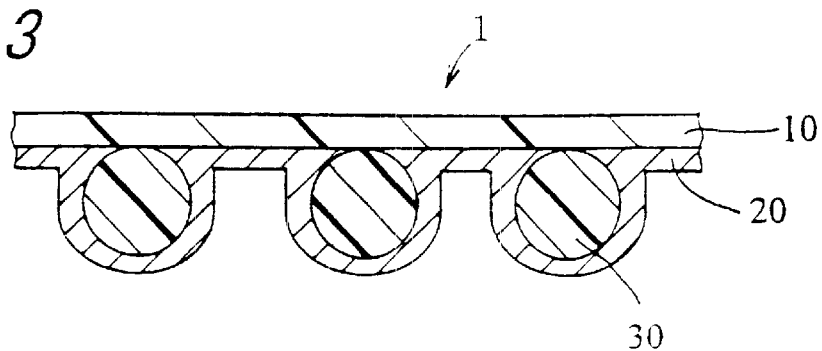
FIG. 3 is a sectional view showing a reflector 1 according to an embodiment of the invention.

As the protrusions, particles of acrylic resin (manufactured by Negami Kogyo Co., Ltd.) 5 μm in mean particle diameter were blended together with an acrylic resin (manufactured by Mitsui Chemicals Inc., trademark Almatex) binder in a solvent comprising toluene and methyl ethyl ketone in such a manner that the resulting solution may contain 35 wt % of solid matter and that the particles may account for 10 wt % of the solid matter. Then, the resulting solution was applied to a 50-μm thick PET film to obtain a protrusion layer. Subsequently, on the protrusion layer, a 5-nm thick layer of zinc oxide was formed as a light transmitting oxide film layer by means of DC magnetron sputtering using zinc oxide (99.9% purity) doped with 2% of $Al_2O_3$ as the target and 99.5% pure argon as the sputtering gas. Then, without taking the film out from the sputtering apparatus, a 200-nm thick layer of silver was formed similarly as a silver layer by means of DC magnetron sputtering using 99.9% pure silver as the target and 99.5% pure argon as the sputtering gas. Subsequently, without taking the film out from the sputtering apparatus, an 8-nm thick layer of APC2% (an alloy containing 2 wt % in total of Pd and Cu with respect to Ag) was formed as an alloy metallic layer mainly containing silver by means of DC magnetron sputtering using 99.9% pure APC2% as the target and 99.5% pure argon as the sputtering gas. Then, without taking the film out from the sputtering apparatus, a 5-nm thick zinc oxide layer was formed as a protective layer by means of DC magnetron sputtering using zinc oxide (purity: 99.9%) doped with 2% of $Al_2O_3$ as the target and a 99.5% pure argon as the sputtering gas. Thus was obtained the desired reflector 1 as shown in FIG. 3. Thereafter, by setting a 150-diameter integration sphere inside a HITACHI spectrophotometer (Model U-3400), the total reflectance and the diffuse reflectance of the reflector 1 were measured at a wavelength of 550 nm from the PET film side to obtain a total reflectance was 93.8%, a diffuse reflectance of 7.0%, a diffusivity of 7.5%. Moreover, an average value for the height of the protrusion was found to be 3.3 μm, and an average value for the maximum width thereof was found to be 4.3 μm Further, 58 protrusions were found present in an area of 1 $mm^2$. The reflector 1 subjected to the measurement was then placed in a thermostat under constant humidity, and was allowed to stand for 500 hours under a hot humid condition of 60° C. and 90% RH. After passage of 500 hours, the reflector 1 was taken out to observe the surface, but no agglomeration of metal was observed, and the color remained white. On measuring again the total reflectance and the diffuse reflectance by means of spectrophotometer, a reflectance of 93.5% and a diffuse reflectance of 6.9% were obtained unchanged from the values obtained prior to the hot humid treatment. The reflection sheet was then placed on one main surface of the light guiding plate so that the PET film is opposed to the light guiding plate, to thereby obtain a sidelight type backlighting apparatus 2 as shown in FIG. 2. The light source 60 was turned on in this state, and measurements were made on brightness at the center of the light-outgoing surface of the apparatus obtained along the front direction, as well as on the uneven brightness of the planar light source. The results are shown in Table 2.

TABLE 2

| | Reflector | | | | | | Backlight | | |
| | Total reflectance (%) | | Diffuse reflectance (%) | | | | | | |
| | Hot humid test | | Hot humid test | | | | | Generation | |
| | Not applied | Applied | Not applied | Applied | Protrusion height (μm) | Particles/ $mm^2$ | Luminance ($cd/m^2$) | of uneven brightness | Total evaluation |
| Ex 3 | 93.8 | 93.5 | 7.0 | 6.9 | 3.3 | 58 | 2211 | None | Good |
| Ex 4 | 92.3 | 92.2 | 12.3 | 12.4 | 2.0 | 69 | 2198 | None | Good |
| Ex 5 | 92.6 | 92.7 | 10.1 | 10.2 | 3.1 | 53 | 2202 | None | Good |
| Comp Ex 3 | 91.4 | 91.3 | 82.3 | 82.4 | | ≧200 | 1710 | Generated | Poor |

Example 4

As the protrusions, silica particles 3 μm in mean particle diameter were blended together with an acrylic resin binder, and a solution was prepared by adding a solvent comprising toluene and methylethyl ketone in such a manner that the solution may contain 35 wt % of solid matter and the particles accounting for 15 wt % of the solid matter. The resulting solution was applied to a 75-μm thick PET film to obtain a protrusion layer. Subsequently, a reflection layer 20 was prepared in conformity with the condition of Example 3, whereby a reflector 1 was obtained. Then, measurements were conducted in a manner similar to that described in Example 3 to obtain the following results: a total reflectance of 92.3%; a diffuse reflectance of 12.3%; and a diffusivity of 13.3%. Moreover, an average value for the height of the protrusion was found to be 2.0 μm, an average value for the maximum width thereof was found to be 3.1 μm, and 69 particles were found present in an area of 1 $mm^2$. Then, under the conditions similar to those described in Example 3, the reflection sheet was allowed to stand for 500 hours in a high temperature thermostat under constant humidity, and the reflectance was measured again to obtain a total reflectance of 92.2% and a diffuse reflectance of 12.4%, which remained almost unchanged from the values obtained prior to the hot humid treatment. Furthermore, no agglomeration spots ascribed to the degradation of silver were observed. The reflector 1 was then placed on one main surface of the light guiding plate 50 so that the PET film is opposed to the light guiding plate 50, and observations were performed in a manner similar to those described in Example 3. The results are shown in Table 2.

Example 5

A solution was prepared in a manner similar to that described in Example 3, except for using polystyrene particles 5 μm in mean particle diameter. The resulting solution was applied to a 75-μm thick PET film (A) to obtain a protrusion layer. Subsequently, on the protrusion layer, a 5-nm thick layer of zinc oxide was formed as a light transmitting oxide film layer by means of DC magnetron sputtering using zinc oxide (99.9% purity) doped with 2% of $Al_2O_3$ as the target and 99.5% pure argon as the sputtering gas. Then, without taking the film out from the sputtering apparatus, a 200-nm thick layer of silver was formed similarly to provide a silver layer by means of DC magnetron sputtering using 99.9% pure silver as the target and 99.5% pure argon as the sputtering gas. Subsequently, without taking the film out from the sputtering apparatus, an 8-nm thick layer of APC2% (an alloy containing 2 wt % in total of Pd and Cu with respect to Ag) was formed as an alloy metallic layer mainly containing silver by means of DC magnetron sputtering using 99.9% pure APC2% as the target and 99.5% pure argon as the sputtering gas. Then, without taking the film out from the sputtering apparatus, a 5-nm thick zinc oxide layer was formed as a protective layer by means of DC magnetron sputtering using titanium (purity: 99.9%) doped with 2% of $Al_2O_3$ as the target and a 99.5% pure argon as the sputtering gas.

Then, the desired reflector 1 was obtained by adhering a 75-μm thick PET film (B) to the reflection layer 20 with an acrylic pressure adhesive to form the reflector 1. Thereafter, by setting a 150-diameter integration sphere inside a HITACHI spectrophotometer (Model U-3400), the total reflectance and the diffuse reflectance of the reflector 1 were measured at a wavelength of 550 nm from the PET film (A) side. As a result, a total reflectance of 92.6% and a diffuse reflectance of 10.1% were obtained with a diffusivity of 10.9%. Moreover, an average value for the height of the protrusion was found to be 3.1 μm, an average value for the maximum width thereof was found to be 4.4 μm, and 53 particles were found present in an area of 1 mm². The reflector 1 subjected to the measurement was then placed in a thermostat under constant humidity, and was allowed to stand for 500 hours under a hot humid condition of 60° C. and 90% RH. After passage of 500 hours, the reflector 1 was taken out to observe the surface, but no agglomeration of metal was observed, and the color remained white. On measuring again the total reflectance and the diffuse reflectance by means of spectrophotometer, a reflectance of 92.7% and a diffuse reflectance of 10.2% were obtained almost unchanged from the values obtained prior to the hot humid treatment. The reflector 1 was then placed on one main surface of the light guiding plate so that the PET film (A) is opposed to the light guiding plate, to thereby obtain a sidelight type backlighting apparatus 2 as shown in FIG. 2. The light source 60 was turned on in this state, and measurements were made on the brightness at the center of the light-outgoing surface of the apparatus obtained along the front direction, as well as on the uneven brightness of the planar light source. The results are shown in Table 2.

Comparative Example 3

A reflector 1 was obtained in a manner similar to that described in Example 3, except for preparing a solution in which the particles accounted for 42.0 wt % of the solid matter. On measuring the reflectance, a total reflectance of 91.4% and a diffuse reflectance of 82.3% were obtained with a diffusivity of 90.0%. Moreover, 200 or above protrusions were found present in an area of 1 mm². Subsequently, a hot humid test was performed under conditions similar to those described in Example 3, and the reflectance was measured again to obtain total reflectance of 91.3% and a diffuse reflectance of 82.4%, which remained unchanged. No spots ascribed to the agglomeration of silver were observed on the surface. Thereafter, the reflector 1 was set on the light guiding plate 50 in a similar manner to that described in Example 3 to obtain a sidelight type backlighting apparatus 2, and observations were conducted thereon under conditions similar to those in Example 3. The results are given in Table 2.

As is understood from Table 2, all of Examples 3, 4, and 5 are free from uneven brightness, achieve sufficient brightness, and exhibit satisfactory characteristics as a backlight. By contrast, Comparative Example 3 has a higher diffuse reflectance and thus suffers from uneven brightness.

Figure 4:
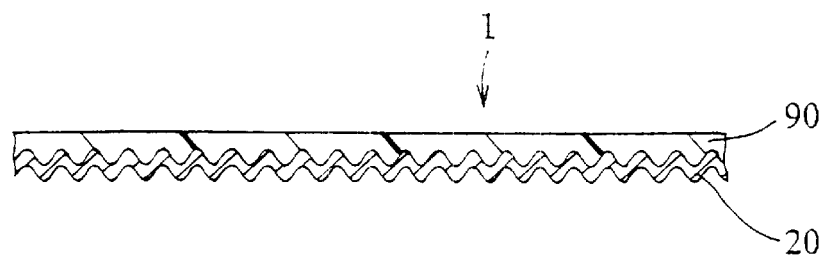
FIG. 4 is a sectional view showing a reflector 1 according to an embodiment of the invention.

Next, referring to FIG. 4, a description is given as to the case where the reflector 1, which is obtained by forming a reflection layer 20 on a film 90 having dispersed therein particles, is arranged so that the surface B of the reflector 1 is opposed to the light guiding plate 50, and the interval between the light guiding plate 50 and the reflection layer 20 is controlled by the thickness of the substrate 10 and the height of the protrusion.

Example 6

On a 50-μm thick PET film (having a total light transmittance of 88.0% at a wavelength of 550 nm) containing dispersed therein acrylic resin particles (having a refractive index of 1.49) 2 μm in mean particle diameter in such a manner that the cloud value thereof be 2.5%, a 5-nm thick layer of zinc oxide was formed by means of DC magnetron sputtering using zinc oxide (99.9% purity) doped with 2% of $Al_2O_3$ as the target and 99.5% pure argon as the sputtering gas, whereby a base layer was formed. Then, without taking the film out from the sputtering apparatus, a 200-nm thick layer of silver was formed similarly by means of DC magnetron sputtering using 99.9% pure silver as the target and 99.5% pure argon as the sputtering gas. Subsequently, without taking the film out from the sputtering apparatus, an 8-nm thick layer of APC2% (an alloy containing 2 wt % in total of Pd and Cu with respect to Ag) was formed by means of DC magnetron sputtering using 99.9% pure APC2% as the target and 99.5% pure argon as the sputtering gas. Then, without taking the film out from the sputtering apparatus, a 5-nm thick zinc oxide layer was formed by means of DC magnetron sputtering using zinc oxide (purity: 99.9%) doped with 2% of $Al_2O_3$ as the target and a 99.5% pure argon as the sputtering gas, whereby a protective layer was formed. Thus was obtained a reflector 1 obtained by forming the reflection layer 20 on the polymer film 90 having dispersed therein particles, as shown in FIG. 4. Thereafter, by setting a 150-diameter integration sphere inside a HITACHI spectrophotometer (Model U-3400), the total reflectance and the diffuse reflectance of the reflector 1 were measured at a wavelength of 550 nm from the PET film side. As a result, a total reflectance of 93.5% and a diffuse reflectance of 5.6% were obtained with a diffusivity of 6.0%. Moreover, an average value for the height of the protrusion was found to be 1.1 μm, an average value for the maximum width thereof was found to be 1.8 μm, and 40 protrusions were found present in an area of 1 mm². The reflector 1 subjected to the measurement was then placed in a thermostat under constant humidity, and was allowed to stand for 500 hours under a hot humid condition of 60° C. and 90% RH. After passage of 500 hours, the sheet was taken out to observe the surface, but no agglomeration of metal was observed, and the color remained white. On measuring again the total reflectance and the diffuse reflectance by means of spectrophotometer, a reflectance of 93.3% and a diffuse reflectance of 5.5% were obtained almost unchanged from the values obtained prior to the hot humid treatment. The reflector 1 was then placed on one main surface of the light guiding plate 50 so that the PET film is opposed to the light guiding plate 50, to thereby obtain a sidelight type backlighting apparatus 2 as shown in FIG. 2. The light source 60 was turned on in this state, and measurements were made on the brightness at the center of the light-outgoing surface of the apparatus obtained along the front direction, as well as on the uneven brightness of the planar light source. The results are shown in Table 3.

90.2%. Moreover, 200 or above of particles were found present in an area of 1 mm$^2$. Then, after performing the hot humid test similar to that described in Example 6, the reflectance was measured again to obtain a total reflectance of 91.7% and a diffuse reflectance of 82.6%, which remained almost unchanged from the values obtained prior to the hot humid treatment. Furthermore, no agglomeration spots ascribed to the degradation of silver were observed. Thereafter, the reflector 1 was set on the light guiding plate 50 in a manner similar to that in Example 6 to obtain a sidelight type backlighting apparatus 2. Then, observations

TABLE 3

| | Reflector | | | | | Backlight | | |
|---|---|---|---|---|---|---|---|---|
| | Total reflectance (%) | | Diffuse reflectance (%) | | | | | |
| | Hot humid test | | Hot humid test | | | | Generation | |
| | Not applied | Applied | Not applied | Applied | Protrusion height (μm) | Particles/ mm$^2$ | Luminance (cd/m$^2$) | of uneven brightness | Total evaluation |
| Ex 6 | 93.5 | 93.3 | 5.6 | 5.5 | 1.1 | 40 | 2215 | None | Good |
| Ex 7 | 92.6 | 92.8 | 6.8 | 6.5 | 1.8 | 60 | 2233 | None | Good |
| Comp Ex 4 | 91.8 | 91.7 | 82.8 | 82.6 | — | ≧200 | 1702 | Generated | Poor |

Example 7

A reflector 1 was formed by following the process described in Example 6, except for using a 70-μm thick PET film (having a total light transmittance of 86.8% at a wavelength of 550 nm) containing dispersed therein fine silica particles (having a refractive index of 1.52) 3 μm in mean particle diameter, in such a manner that the cloud value of the film be 4.6%. The reflector 1 thus obtained was subjected to measurements of reflectance in conformity with the condition of Example 6 to obtain a total reflectance of 92.6% and a diffuse reflectance of 6.8%, with a diffusivity of 7.3%. Moreover, an average value for the height of the protrusion was found to be 1.8 μm, an average value for the maximum width thereof was found to be 2.6 μm, and 60 particles were found present in an area of 1 mm$^2$. Then, under the conditions similar to those described in Example 6, the reflection sheet was allowed to stand for 500 hours in a high temperature thermostat under constant humidity, and the reflectance was measured again to obtain a total reflectance of 92.8% and a diffuse reflectance of 6.5%, which remained almost unchanged from the values obtained prior to the hot humid treatment. Furthermore, no agglomeration spots ascribed to the degradation of silver were observed. The reflector 1 was then placed on one main surface of the light guiding plate 50 so that the PET film is opposed to the light guiding plate 50, and observations were performed in a manner similar to those described in Example 6. The results are shown in Table 3.

Comparative Example 4

A reflector 1 was formed in conformity with the conditions described in Example 6 using a 50-μm thick PET film (having a total light transmittance of 83.0% at a wavelength of 550 nm) containing dispersed therein the same particles used in Example 6, in such a manner that the cloud value of the film be 75.0%. As a result of measuring the reflectance of the reflector 1 formed in conformity with the conditions of Example 6, a total reflectance of 91.8% and a diffuse reflectance of 82.8% were obtained with a diffusivity of similar to those in Example 6 were conducted thereon. The results are given in Table 3.

As is understood from Table 3, both of Examples 6 and 7 are free from uneven brightness, achieve sufficient brightness, and exhibit satisfactory characteristics as a backlight. By contrast, Comparative Example 4 has a higher diffuse reflectance and thus suffers from uneven brightness.

Figure 5:
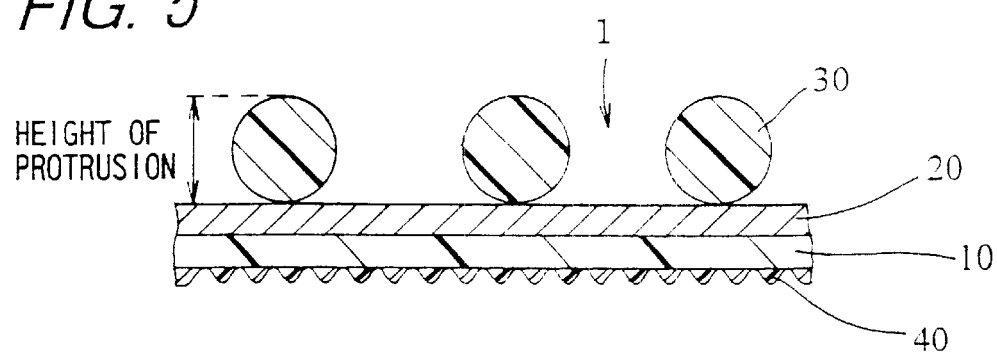
FIG. 5 is a sectional view showing a reflector 1 according to an embodiment of the invention.

Next, referring to FIG. 5, a description is given as to the case where the reflector 1, which is obtained by forming a reflection layer 20 on a substrate 10 and then applying particles thereto, is arranged so that the surface A of the reflector 1 is opposed to the light guiding plate 50, and the interval between the light guiding plate 50 and the reflection layer 20 is controlled by the height of the protrusion.

Example 8

On the surface A of a 188-μm thick PET film, a 5-nm thick layer of zinc oxide was formed by means of DC magnetron sputtering using zinc oxide (99.9% purity) doped with 2% of Al$_2$O$_3$ as the target and 99.5% pure argon as the sputtering gas, whereby a base layer was formed. Then, without taking the film out from the sputtering apparatus, a 150-nm thick layer of silver was formed similarly by means of DC magnetron sputtering using 99.9% pure silver as the target and 99.5% pure argon as the sputtering gas. Subsequently, without taking the film out from the sputtering apparatus, a 5-nm thick layer of zinc oxide was formed as a protective layer by means of DC magnetron sputtering using zinc oxide (purity: 99.9%) doped with 2% of Al$_2$O$_3$ as the target and a 99.5% pure argon as the sputtering gas to provide a reflection layer 20.

Then, as the protrusions, acrylic particles 30 μm in mean particle diameter were blended in an acrylic resin binder at an amount of 6.5 wt %, and a solution was prepared by adding a solvent comprising toluene and methyl ethyl ketone in such a manner that the solution may contain 24 wt % of solid matter. The resulting solution was applied to the thus formed sputtered surface at a wet coverage of 15 g/m$^2$ to obtain protrusions on the surface A side. On observing the protrusions under a microscope, 12 particles were confirmed to be present per square millimeter area of the film.

Subsequently, acrylic particles 1.5 μm in mean particle diameter were blended in an acrylic resin binder at an amount of 1.5 wt %, and a solution was prepared by adding a solvent comprising toluene and methyl ethyl ketone in such a manner that the solution may contain 15 wt % of solid matter. The resulting solution was applied to a PET film to obtain protrusions on the surface B. Thus was obtained a desired reflector 1 as shown in FIG. 5.

Figure 6:
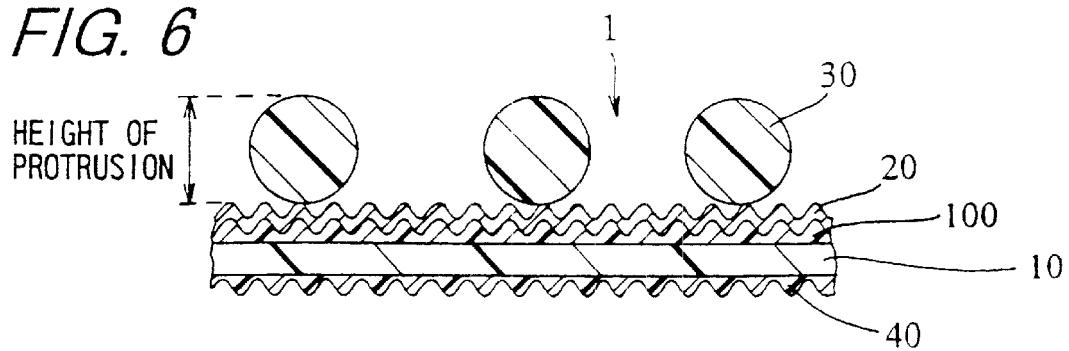
FIG. 6 is a sectional view showing a reflector 1 according to an embodiment of the invention.

Thereafter, by setting a 150-diameter integration sphere inside a HITACHI spectrophotometer (Model U-3400), the total reflectance and the diffuse reflectance of the reflector 1 were measured at a wavelength of 550 nm from the metallic layer side (surface A side). As a result, a total reflectance of 95.2% and a diffuse reflectance of 5.2% were obtained with a diffusivity of 5.5%. Moreover, an average value for the height of the protrusion was found to be 26.8 μm, an average value for the maximum width thereof was found to be 30.1 μm, and 20 particles each 15 to 35 μm in height and 20 to 40 μm in maximum width were found present in an area of 1 $mm^2$. The reflector 1 subjected to the measurement was then placed in a thermostat under constant humidity, and was allowed to stand for 500 hours under a hot humid condition of 60° C. and 90% RH. After passage of 500 hours, the reflector 1 was taken out to observe the surface, but no generation of pinholes attributed to the agglomeration of metal was observed. On measuring again the total reflectance and the diffuse reflectance by means of spectrophotometer, a reflectance of 95.1% and a diffuse reflectance of 5.3% were obtained almost unchanged from the values obtained prior to the hot humid treatment. The reflector 1 was then placed on one main surface of the light guiding plate 50 so that the metallic layer (surface A side) is opposed to the light guiding plate 50 to thereby obtain a sidelight type backlighting apparatus 2 as shown in FIG. 2. The light source 60 was turned on in this state, and measurements were made on brightness at the center of the light-outgoing surface of the apparatus obtained along the front direction, as well as on uneven brightness in a case strain was applied to the thus placed reflector 1 by pressing with fingers thereto. The results are shown in Table 4.

thick layer of titanium was formed by means of DC magnetron sputtering using 99.9% pure titanium as the target and 99.5% pure argon as the sputtering gas, whereby a base layer was formed. Then, without taking the film out from the sputtering apparatus, a 150-nm thick layer of silver was formed similarly by means of DC magnetron sputtering using 99.9% pure silver as the target and 99.5% pure argon as the sputtering gas. Then, without taking the film out from the sputtering apparatus, a 5-nm thick layer of zinc oxide doped with gallium was formed as a protective layer by means of DC magnetron sputtering using zinc oxide (purity: 99.9%) doped with 5% of gallium as the target and a 99.5% pure argon as the sputtering gas to provide a reflection layer 20. Thereafter, light transmitting protrusions and a smoothed layer 40 were formed in conformity with the condition of Example 8 to obtain a reflector 1 as shown in FIG. 6 in which the particles 30 are further applied to the protrusion layer 100.

Thereafter, by setting a 150-diameter integration sphere inside a HITACHI spectrophotometer (Model U-3400), the total reflectance and the diffuse reflectance of the reflector 1 were measured at a wavelength of 550 nm from the metallic layer side (surface A side). As a result, a total reflectance of 94.6% and a diffuse reflectance of 6.8% were obtained with a diffusivity of 7.2%. Moreover, an average value for the height of the protrusion was found to be 26.2 μm, an average value for the maximum width thereof was found to be 30.4 μm, and 20 particles each 15 to 35 μm in height and 20 to 40 μm in maximum width were found present in an area of 1 $mm^2$. The reflector 1 subjected to the measurement was then placed in a thermostat under constant humidity, and was allowed to stand for 500 hours under a hot humid condition of 60° C. and 90% RH. After passage of 500 hours, the reflector 1 was taken out to observe the surface, but no generation of pinholes attributed to the agglomeration of metal was observed. On measuring again the total reflectance and the diffuse reflectance by means of spectrophotometer, a reflectance of 94.5% and a diffuse reflectance of 6.9% were obtained almost unchanged from the values obtained prior to the hot humid treatment. The reflector 1 was then set in the light guiding plate 50 in conformity with the condition of Example 8. The resulting light source 60 was turned on in this state, and measure-

TABLE 4

| | Reflector | | | | | | Backlight | | |
|---|---|---|---|---|---|---|---|---|---|
| | Total reflectance (%) | | Diffuse reflectance (%) | | | | | | |
| | Hot humid test | | Hot humid test | | | | | Generation | |
| | Not applied | Applied | Not applied | Applied | Protrusion height (μm) | Particles/ $mm^2$ | Luminance (cd/$m^2$) | of uneven brightness | Total evaluation |
| Ex 8 | 95.2 | 95.1 | 5.8 | 5.9 | 26.8 | 12 | 2289 | None | Good |
| Ex 9 | 94.6 | 94.5 | 6.8 | 6.9 | 26.2 | 11 | 2280 | None | Good |

Example 9

Acrylic particles 1.5 μm in mean particle diameter were blended in an acrylic resin binder, and a solution was prepared by adding a solvent comprising toluene and methyl ethyl ketone in such a manner that the solution may contain 35 wt % of solid matter with particles accounting for 2.0 wt % of the solid matter. The resulting solution was applied to a surface of a 188 μm-thick PET film to obtain a protrusion layer. Then, on the protrusion layer thus obtained, a 10-nm ments were made on the brightness at the center of the light-outgoing surface of the apparatus obtained along the front direction, as well as on uneven brightness in the case strain was applied to the thus placed reflector 1 by pressing with fingers thereto. The results are shown in Table 4.

As is understood from Table 4, both of Examples 8 and 9 are free from uneven brightness, achieve sufficient brightness, and exhibit satisfactory characteristics as a backlight.

Next, a description is given as to the case where the substrate 10 is made of a material other than PET, the reflector 1 is arranged so that the surface A of the reflector 1 is opposed to the light guiding plate 50, and the interval between the light guiding plate 50 and the reflection layer 20 is controlled by the height of the protrusion.

Example 10

A reflector 1 was constructed basically in the same manner as in Example 1, except that, in the former, a 100-μm thick polycarbonate film is employed instead of a PET film. The reflectance of the reflector 1, as well as uneven brightness occurring in a sidelight type backlighting apparatus 2 in which the reflector 1 is set, was observed and the observation results will be shown in Table 5 below.

TABLE 5

| | Reflector | | | | | Backlight | | |
|---|---|---|---|---|---|---|---|---|
| | Total reflectance (%) | | Diffuse reflectance (%) | | | | | |
| | Hot humid test | | Hot humid test | | | | Generation | |
| | Not applied | Applied | Not applied | Applied | Protrusion height (μm) | Particles/ mm² | Luminance (cd/m²) | of uneven brightness | Total evaluation |
| Ex 10 | 95.5 | 95.3 | 5.8 | 5.8 | 26.0 | 21 | 2250 | None | Good |
| Ex 11 | 95.7 | 95.3 | 5.9 | 6.0 | 26.3 | 22 | 2284 | (None) | Good |

Example 11

A reflector 1 was constructed basically in the same manner as in Example 1, except that, in the former, a 2.5-mm thick toughened glass plate is employed instead of a PET film. The reflectance of the reflector 1, as well as uneven brightness occurring in a sidelight type backlighting apparatus 2 in which the reflector 1 is set, was observed and the observation results will be shown in Table 5 above.

As is understood from Table 5, both of Examples 10 and 11 are free from uneven brightness, achieve sufficient brightness, and exhibit satisfactory characteristics as a backlight.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. A reflector comprising:

a substrate; and a reflection layer formed on one main surface of the substrate, wherein total reflectance is 85% or higher, and diffusivity of the reflector exists within a range of 1 to 50%, the diffusivity being defined as the ratio of diffuse reflectance to total reflectance.

2. The reflector of claim 1, wherein the substrate is made of a polymer film.

3. The reflector of claim 1, wherein the reflector has a total reflectance of 90% or higher and a diffuse reflectance of 15% or lower at a wavelength of 550 nm.

4. The reflector of claim 2, wherein the reflector has a total reflectance of 90% or higher and a diffuse reflectance of 15% or lower at a wavelength of 550 nm.

5. The reflector of claim 1, further comprising:

protrusions on the reflection layer side of the substrate, the number of the protrusions per square millimeter area of the substrate been two or more but not more than 100, the protrusions each having a maximum of 0.1–50 μm and a height of 0.1–45 μm.

6. The reflector of claim 2, further comprising: protrusions on the reflection layer side of the substrate, the number of the protrusions per square millimeter area of the substrate being two or more but not more than 100, the protrusions each having a maximum width 0.1–50 μm and a height of 0.1–45 μm.

7. The reflector of claim 3, further comprising:

protrusions on the reflection layer side of the substrate, the number of the protrusions per square millimeter area of the substrate being two or more but not more than 100, the protrusions each having a maximum width of 0.1–50 μm and a height of 0.1–45 μm.

8. The reflector of claim 5, wherein the protrusions have maximum width of 10–50 μm and a height of 5–45 μm.

9. The reflector of claim 6, wherein the protrusions have a maximum width of 10–50 μm and a height of 5–45 μm.

10. The reflector of claim 7, wherein the protrusions have a maximum width of 10–50 μm and a height of 5–45 μm.

11. The reflector of claim 5, wherein the protrusions are formed by applying to the substrate a coating solution which contains particles having a mean particle size of 0.1 μm or greater but not greater than 50 μm, and a binder resin.

12. The reflector of claim 6, wherein the protrusions are formed by applying to the substrate a coating solution which, contains particles having a mean particle size of 0.1 μm or greater but not greater than 50 μm, and a binder resin.

13. The reflector of claim 7, wherein the protrusions are formed by applying to the substrate a coating solution which contains particles having a mean particle size of 0.1 μm, or greater but not greater than 50 μm, and a binder resin.

14. The reflector of claim 5, wherein the protrusions are formed by applying to the reflection layer a coating solution which contains particles having a mean particle size of 0.1 μm or greater but not greater than 50 μm, and a binder resin.

15. The reflector of claim 6, wherein the protrusions are formed by applying to the reflection layer a coating solution which contains particles having a mean particle size of 0.1 μm or greater but not greater than 50 μm, and a binder resin.

16. The reflector of claim 17, wherein the protrusions are formed by applying to the reflection layer a coating solution which contains particles having a mean particle size of 0.1 μm or greater but not greater than 50 μm, and a binder resin.

17. The reflector of claim 11, wherein the protrusions are formed by applying to the reflection layer a coating solution which contains particles having a mean particle size of 0.1 µm or greater but not greater than 50 µm, and a binder resin.

18. The reflector of claim 12, wherein the protrusions are formed by applying to the reflection layer a coating solution which contains particles having a mean particle size of 0.1 µm or greater but not greater than 50 µm, and a binder resin.

19. The reflector of claim 13, wherein the protrusions are formed by applying to the reflection layer a coating solution which contains particles having a mean particle size of 0.1 µm or greater but not greater than 50 µm, and a binder resin.

20. The reflector of claim 2, wherein the polymer film has protrusions which are formed by fine particles contained therein.

21. The reflector of claim 1, wherein the reflection layer comprises a base layer (a), metallic layer mainly containing silver (b), and a protective layer (c), the layers being laminated in the order of (a), (b), (c) on the substrate.

22. The reflector of claim 2, wherein the reflection layer comprises a base layer (a), a metallic layer mainly containing silver (b), and a protective layer (c), the layers being laminated in the order of (a), (b), (c) on the substrate.

23. The reflector of claim 3, wherein the reflection layer comprising a base layer (a), a metallic layer mainly containing silver (b), and a protective layer (c), the layer being laminated in the order of (a), (b), (c) on the substrate.

24. The reflector of claim 5, wherein the reflection layer comprises a base layer (a), a metallic layer mainly containing silver (b), and a protective layer (c), the layers being laminated in the order of (a), (b), (c) on the substrate.

25. The reflector of claim 21, wherein the base layer (a) comprises a metallic layer made of one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer having a thickness 5 nm or more but not more than 50 nm; and/or a light transmitting oxide layer made of a light transmitting oxide, having a thickness of 1 nm or more but not more than 20 nm.

26. The reflector of claim 22, wherein the base later (a) comprises a metallic layer made of one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer heaving a thickness of 5 nm or more but not more than 50 nm; and/or a light transmitting oxide layer made of a light transmitting oxide, having a thickness of 1 nm or more but not than 20 nm.

27. The reflector of claim 23, wherein the base layer (a) comprises a metallic layer made of one metal selected from the group consisting of sold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm; and/or a light transmitting oxide layer made of a light transmitting oxide, having a thickness of 1 nm or more but not more than 20 nm.

28. The reflector of claim 24 wherein the base layer (a) comprises a metallic layer made of one metal selected from the group consisting gold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm; and/or a light transmitting oxide layer made of a light transmitting oxide, having a thickness of 1 nm or more but not more than 20 nm.

29. The reflector of claim 21 wherein the metallic layer mainly containing silver (b) has a thickness of 70 nm or more but not more than 400 nm, and comprises simply silver, or comprises at least one selected from the group consisting of gold, copper, nickel, iron, cobalt, tungsten, molybdenum, tantalum, chromium, indium, manganese, titanium, and palladium, or an alloy mainly containing silver.

30. The reflector of claim 23, wherein the metallic layer mainly containing silver (b) has a thickness 70 nm or more but not more than 400 nm, and comprises simply silver, or comprises at least one selected from the group consisting of gold, copper, nickel, iron, cobalt, tungsten, molybdenum, tantalum, chromium, indium, manganese, titanium, and palladium, or an alloy mainly containing silver.

31. The reflector of claim 23, wherein the metallic layer mainly containing silver (b) has a thickness of 70 nm or more but not more than 400 nm, and comprises simply silver, or comprises at least one selected from the group consisting of gold, copper, nickel, iron, cobalt, tungsten, molybdenum, tantalum, chromium, indium, manganese, titanium, and palladium, or an alloy mainly containing silver.

32. The reflector of claim 24, wherein the metallic layer mainly containing silver (b) has a thickness of 70 nm, or more but not more than 400 nm, and comprises simply silver, or comprises at least one selected from the group consisting of gold, copper, nickel, iron, cobalt, tungsten, molybdenum, tantalum, chromium, indium, manganese, titanium, and palladium, or an alloy mainly containing silver.

33. The reflector of claim 25, wherein the metallic layer mainly containing silver (b) has a thickness of 70 nm or more but not more than 400 nm, and comprises simply silver, or comprises at least one selected from the group consisting of gold, copper, nickel, iron, cobalt, tungsten, molybdenum, tantalum, chromium, indium, manganese, titanium, and palladium, or an alloy mainly containing silver.

34. The reflector of claim 21, wherein the protective layer (c) comprises a metallic layer made of one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm, and/or a light transmitting oxide layer made of a light transmitting oxide, having a thickness of 1 nm or more than 20 nm.

35. The reflector of claim wherein the protective layer (c) comprises a metallic layer made of one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm, and/or a light transmitting oxide layer made of a light transmitting oxide, having a thickness of 1 nm or more but not more than 20 nm.

36. The reflector of claim 23, wherein the protective layer (c) comprises a metallic layer made of one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm, and/or a light transmitting oxide layer made of a light transmitting oxide, having a thickness of 1 nm or more but not more than 20 nm.

37. The reflector of claim 24, wherein the protective layer (c) comprises a metallic layer made of one metal selected from the group consisting of gold, copper, nickel, iron, cobalt, tungsten, molybdenum, tantalum, chromium, indium, manganese, titanium, and palladium, and/or of an alloy of two or m ore selected from the group, the metallic layer having a thickness of 5 nm or more but not more than 50 nm, and/or a light transmitting oxide layer made of a light transmitting oxide, having a thickness of 1 nm or more but no more than 20 nm.

38. The reflector of claim 25, wherein the protective layer (c) comprises a metallic layer made of one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm, and/or a light transmitting oxide layer made of a light transmitting oxide, having a thickness of 1 nm or more but not more than 20 nm.

39. The ref lector of claim 29, wherein the protective layer (c) comprises a metallic layer made one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm, and/or a light transmitting oxide layer made of a light transmitting oxide, having a thickness of 1 nm or more but not more than 20 nm.

40. The reflector of claim 33, wherein the protective layer (c) comprises a metallic layer made of one metal selected from the group consisting of gold, copper, nickel, iron, cobalt, tungsten, molybdenum, tantalum, chromium, indium, manganese, titanium, and palladium, and/or of an alloy of two or more selected from the group, the metallic layer having a thickness of 5 nm or more but not more than 50 nm, and/or a light transmitting oxide layer made of a light transmitting oxide, having a thickness of 1 nm or more but not more than 20 nm.

41. The reflector of claim 1, wherein the other main surface of the substrate hazing no reflection layer formed thereon is subjected to a smoothing treatment.

42. A sidelight type backlighting apparatus comprising:
    a light source;
    a light guiding plate for transmitting and letting out light incident from the light source, the source being disposed on a side surface side of the light guiding plate; and the reflector of claim 1, disposed on one main surface of the light guiding plate.

43. The sidelight type backlighting apparatus of claim 42, wherein the reflector is arranged such that the reflection layer is opposed to the light guiding plate.

44. A liquid crystal display apparatus comprising the sidelight type backlighting apparatus of claim 42.

* * * * *

UNITED STATES PATENT AND TRADEMARK OFFICE
CERTIFICATE OF CORRECTION

PATENT NO.    : 6,683,720 B2
DATED         : January 27, 2004
INVENTOR(S)   : Hirotaka Yoshida et al.

It is certified that error appears in the above-identified patent and that said Letters Patent is hereby corrected as shown below:

<u>Title page,</u>
Item [30], Foreign Application Priority Data, change
" Dec. 14, 2000 (JP) ................................... 2000-386774" to
-- Dec. 14, 2000 (JP) ................................... 2000-380774 --.

Signed and Sealed this

Seventeenth Day of August, 2004

JON W. DUDAS
*Acting Director of the United States Patent and Trademark Office*